(12) United States Patent
Smith et al.

(10) Patent No.: US 12,099,526 B1
(45) Date of Patent: Sep. 24, 2024

(54) APPARATUS AND METHOD FOR DETERMINING CLUSTER PAIRS

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

(*) Notice: Subject to any disclaimer, the term of this patent is extended or adjusted under 35 U.S.C. 154(b) by 0 days.

(21) Appl. No.: 18/403,980

(22) Filed: Jan. 4, 2024

(51) Int. Cl.
*G06F 16/00* (2019.01)
*G06F 16/28* (2019.01)
*G06F 16/951* (2019.01)

(52) U.S. Cl.
CPC .......... *G06F 16/285* (2019.01); *G06F 16/951* (2019.01)

(58) Field of Classification Search
CPC .......... G06F 16/2423; G06F 16/24575; G06F 16/24578; G06F 16/29; G06F 16/337; G06F 16/909; G06F 16/9535; G06F 3/048; G06F 3/04817; G06F 21/6245; G06F 21/552; G06F 15/76; G06F 21/577; G06F 16/95; G06F 2221/2111; G06F 21/6263; G06F 21/604; G06F 21/554; G06F 21/316; G06F 21/602; G06F 2221/2141; H04N 21/23418; H04N 21/252; H04L 63/20; H04L 63/102; G06Q 10/0635; G06Q 10/067; G06Q 10/06
See application file for complete search history.

(56) References Cited

U.S. PATENT DOCUMENTS

| 10,102,296 B2 | 10/2018 | Buck | |
|---|---|---|---|
| 2014/0229498 A1* | 8/2014 | Dillon | H04L 67/306 707/767 |
| 2016/0342679 A1 | 11/2016 | Zhu | |
| 2018/0032899 A1* | 2/2018 | Nguyen | G06Q 50/12 |
| 2021/0342962 A1* | 11/2021 | Budlong | G06Q 10/06 |

FOREIGN PATENT DOCUMENTS

IN 202241000562 A 1/2022

* cited by examiner

Primary Examiner — Shyue Jiunn Hwa
(74) Attorney, Agent, or Firm — Caldwell Intellectual Property Law

(57) ABSTRACT

An apparatus for determining cluster pairs, the apparatus comprising a processor and a memory communicatively connected to the processor, the memory containing instructions configuring the processor to receive a first attribute cluster, classify the first attribute cluster to one or more descriptors, generate a first cluster profile as a function of the classification, wherein the first cluster profile comprises a degree of intensity of each descriptor of the one or more descriptors, and determine a complementary cluster profile as a function of the first cluster profile comprising receiving a plurality of complementary cluster profiles from a database and selecting one complementary cluster profile from the plurality of complementary cluster profiles.

20 Claims, 8 Drawing Sheets

APPARATUS AND METHOD FOR DETERMINING CLUSTER PAIRS

FIELD OF THE INVENTION

The present invention generally relates to the field of artificial intelligence. More particularly, the present invention is directed to determining cluster pairs.

BACKGROUND

Current systems used to pair up clusters are lacking and may not provide accurate complementary clusters suitable for pairing.

SUMMARY OF THE DISCLOSURE

In an aspect an apparatus for determining cluster pairs is described. The apparatus includes a processor. and a memory communicatively connected to the processor. The memory contains instructions configuring the processor to receive a first attribute cluster, classify the first attribute cluster to one or more descriptors and generate a first cluster profile as a function of the classification, wherein the first cluster profile comprises a degree of intensity of each descriptor of the one or more descriptors. The processor is further configured to determine a complimentary cluster profile as a function of the first cluster profile. The complementary cluster profile is determined by receiving a plurality of complementary cluster profiles from a database and selecting one complementary cluster profile from the plurality of complementary cluster profiles.

In another aspect a method of determining cluster pairs is described. The method includes receiving, by at least a processor, a first attribute cluster, classifying, by the at least a processor, the first attribute cluster to one or more descriptors and generating, by the at least a processor, a first cluster profile as a function of the classification, wherein the first cluster profile comprises a degree of intensity of each descriptor of the one or more descriptors. The method further includes determining, by the at least a processor, a complementary cluster profile as a function of the first cluster profile by receiving a plurality of complementary cluster profiles from a database selecting one complementary cluster profile from the plurality of complementary cluster profiles.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted. The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining cluster pairs. In an embodiment, apparatus may include a processor and a memory communicatively connected to the processor.

Aspects of the present disclosure can be used to determine cluster pairs. Aspects of the present disclosure can also be used to classify various clusters of data, provide a cluster profile, and select complementary cluster pairs.

Figure 1:
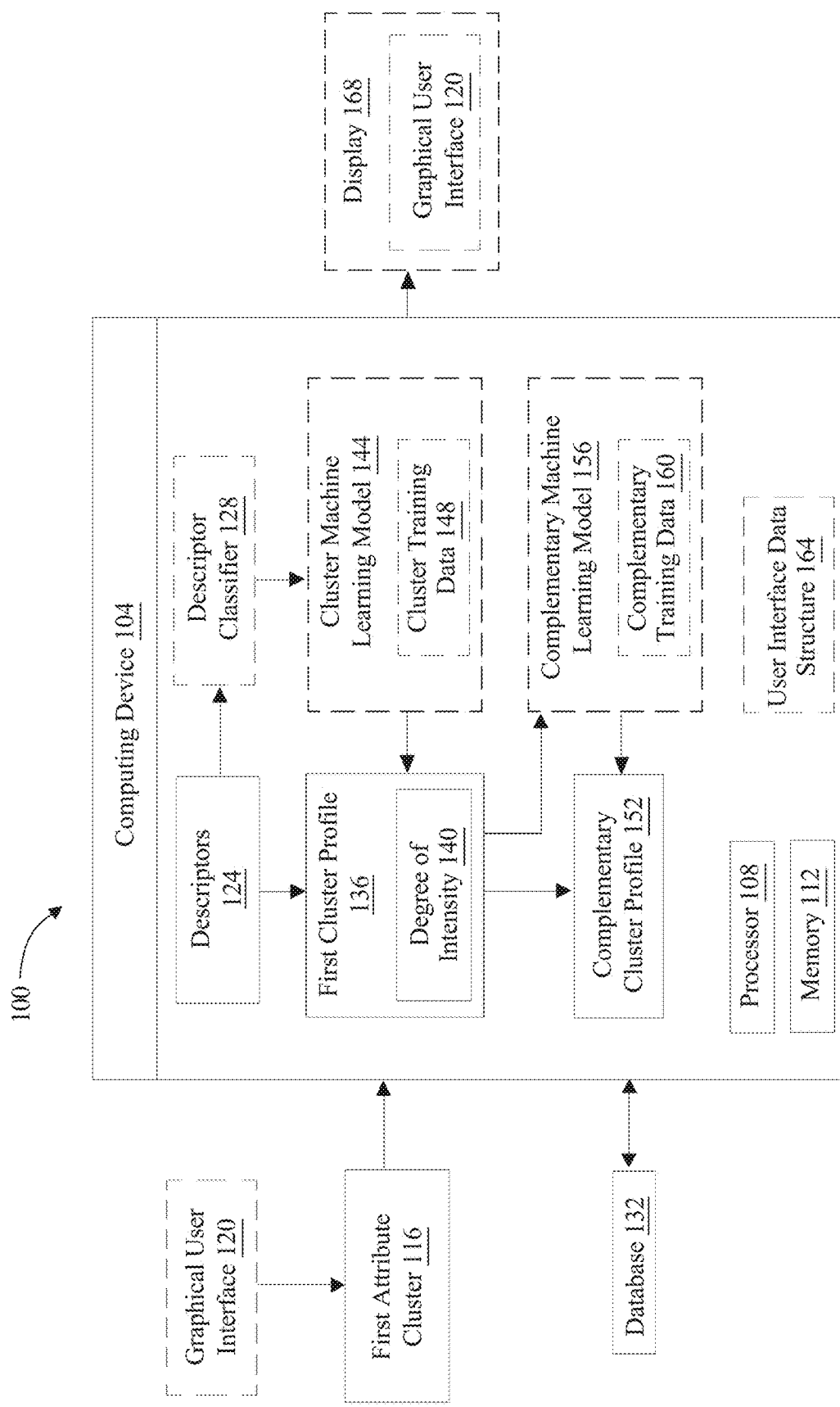
FIG. 1 is a block diagram of an exemplary embodiment of an apparatus for determining cluster pairs.

Referring now to FIG. 1, an exemplary embodiment of an apparatus 100 for determining cluster pairs is described. For the purposes of this disclosure a "cluster pair" is a coupling of two or more sets of information. Cluster pairs may include pairs of information that are correlated and/or associated with one another. In some cases, cluster pairs may include sets of information that are complementary to one another.

With continued reference to FIG. 1, apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 108 is configured to receive a first attribute cluster 116. An "attribute cluster" for the purposes of this disclosure is data relating to a group of related variables that share a common characteristic. For example, a first attribute cluster 116 may include a dataset of information regarding an entity. As used in the current disclosure, an "entity" is an organization comprised of one or more persons with a specific purpose. An entity may include a corporation, organization, business, group one or more persons, and the like. In some cases, first attribute cluster 116 may include a dataset containing data about a particular user. The user may include an employee associated within an entity, a shareholder, or any users associated with the entity. First attribute cluster 116 may include user data such as data relating to a user's insights and/or activities. This may include how a particular engages in a particular action or activity, such as by simplifying or multiplying, how a user tackles a particular action or activity, how a user responds to an event or a series of events, how a user organizes actions or activities, and the like. User data may further include any data relating to a user's collaboration capabilities. This may include the ability to work in groups, the ability to work independently, the ability to work with particular individuals and the like. User data may further include basic information about a particular user such as age, gender, employment status, employment position, personality, work ethic, marital status, work product relating to a user and the like. In some cases, first attribute cluster 116 may include any information necessary to determine a user's collaboration style. In some cases, first attribute cluster 116 may include any set of variables that share a common characteristic, such as data relating to a person, a particular object, a particular class, and the like.

With continued reference to FIG. 1, first attribute cluster 116 may be received by processor 108 via user input. For example, and without limitation, the user or a third party may manually input first attribute cluster 116 using a user interface of computing device 104 or a remote device, such as for example, a smartphone or laptop. In some cases first attribute cluster 116 may be received through a user interface, such as a graphical user interface 120, as described in further detail below. First attribute cluster 116 may additionally be generated via the answer to a series of questions. In a non-limiting embodiment, a user may be prompted to input specific information or may fill out a questionnaire. In an embodiment, a graphical user interface 120 may display a series of questions to prompt a user for information pertaining to first attribute cluster 116. First attribute cluster 116 may be transmitted to processor 108, such as via wired or wireless communication, as previously discussed in this disclosure. first attribute cluster 116 may further be retrieved from multiple sources third-party sources including a user's inventory records, financial records, human resource records, sales records, user notes and observations, job descriptions, and the like.

With continued reference to FIG. 1, processor 108 may be configured to display a plurality of questions to a user through graphical user interface 120 wherein the answers to such questions may be received as elements of first attribute cluster 116. Questions may include, but are not limited to: "After completing your next five rejections to grow 10×, what will you be doing more of—simplifying or multiplying?", "If in the future, you "retire" from one of the two activities, will you be a 100% simplifier or 100% multiplier?", If you're in a room with two other individuals—a 100% simplifier and a 100% multiplier—which annoys you and which one motivates you?", "If you did the same thing all day for 10 straight days—either simplifying or multiplying—which one would energize you and which one would wear you out?", "When you think of crappy stuff today and in the future, are your unique ability activities in simplifying or multiplying?", "Which area of activity—simplifying or multiplying—delights you most when someone else is doing the other activity 100%", "Which 100% focus for you—simplifying or multiplying—will get your company to 10× growth fastest most easily and most enjoyably?", "Over the next 25 years, if you're always confident that you can focus on this activity 100%—simplifying or multiplying—how big could your company grow, with others doing the 100%?", "On those satisfying days that leave you the most energized and optimistic at night, which activity were you doing the most—simplifying or multiplying?", "which activity—simplifying or multiplying—will always make any competitors more anxious and worried about your "secret" success from focusing on it 100%.", and the like. In some cases, users may select answers from an already created set of answers, such as selecting a box with the most appropriate answer. In some cases, user may freely enter information within a text box on a user interface wherein user may answer questions however they see fit.

With continued reference to FIG. 1, first attribute cluster 116 may include data from files or documents that have been converted in machine-encoded test using an optical character reader (OCR). For example, a user may input digital records and/or scanned physical documents that have been converted to digital documents, wherein first attribute cluster 116 may include data that have bene converted into machine readable text. In some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, first attribute cluster 116 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to compile first attribute cluster 116. The web crawler may be seeded and/or trained with a reputable website, such as a user's business website, to begin the search. A web crawler 120 may be generated by computing device 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract any data suitable for first attribute cluster 116.

With continued reference to FIG. 1, processor 108 is configured to classify the first attribute cluster 116 to one or more descriptors 124. "Descriptors" for the purposes of this disclosure is a data set used to identify and/or provide information about a particular data set. For example, descriptors 124 may be used to identify elements with the first attribute cluster 116 and provide information with regard to each element within first attribute cluster 116. In some cases, each element within the first attribute cluster 116 may be classified to a particular descriptor. In some cases, descriptors 124 may include groupings of elements within first attribute cluster 116, wherein each element may be associated with a correlating collaboration skill. The groupings may include a simplifier grouping/class and a multiplier grouping/class, wherein each element within first attribute cluster 116 may be classified to the simplifier grouping or the multiplier grouping. Elements of user data may be labeled to a simplifier grouping, a multiplier grouping and the like. In some cases, classification may provide insight on the particular traits of a user as indicated by the data that has been received. Elements may be classified using a classifier such as a machine learning model. In some cases, one or more descriptors 124 may be used to label various elements within first attribute cluster 116. In some cases, elements within first attribute cluster 116 may be grouped based on particular descriptor, wherein elements containing a similar label are placed within a similar group. In some cases, elements within first attribute cluster 116 may be classified to one or more descriptors 124 using fuzzy sets as described below.

With continued reference to FIG. 1, A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In some cases, processor 108 may generate and train a descriptor classifier 128 configured to receive first attribute cluster 116 and output one or more descriptors 124. Processor 108 and/or another device may generate a classifier using a classification algorithm, defined as a process whereby a computing device 104 derives a classifier from training data. In some cases descriptor classifier 128 may use data to prioritize the order in of labels within first attribute cluster 116. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A descriptor classifier 128 may be trained with training data correlating first attribute cluster 116 to descriptor groupings such as simplifiers, multipliers, and the like. Training data may include a plurality of first attribute clusters correlated to a plurality of descriptors. In an embodiment, training data may be used to show that a particular element within first attribute cluster 116 may be correlated to a particular descriptor 124. Training data may be received from an external computing device, user input, and/or previous iterations of processing. A descriptor classifier 128 may be configured to receive as input and categorize components of first attribute cluster 116 to one or more descriptor groupings. In some cases, processor 108 and/or computing device 104 may then select any elements within first attribute cluster 116 containing a similar label and/or grouping and group them together. In some cases, first attribute cluster 116 may be classified using a classifier machine learning model. In some cases classifier machine learning model may be trained using training data correlating a plurality of first attribute clusters 116 to a plurality of descriptors 124. In an embodiment, a particular element within first attribute cluster 116 may be correlated to a particular descriptor. In some cases, classifying first attribute cluster 116 may include classifying first attribute cluster 116 as a function of the classifier machine learning model. In some cases classifier training data may be generated through user input. In some cases, classifier machine learning model may be trained through user feedback wherein a user may indicate whether a particular element corresponds to a particular class. In some cases, classifier machine learning model may be trained using inputs and outputs based on previous iterations. In some cases, a user may input previous first attribute cluster 116 and corresponding descriptors 124 wherein classifier machine learning model may be trained based on the input.

With continued reference to FIG. 1, computing device 104 and/or processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, apparatus 100 may include a database 132. Database 132 may be implemented, without limitation, as a relational database, a key-value retrieval database such as a NOSQL database, or any other format or structure for use as database 132 that a person skilled in the art would recognize as suitable upon review of the entirety of this disclosure. Database 132 may alternatively or additionally be implemented using a distributed data storage protocol and/or data structure, such as a distributed hash table or the like. Database 132 may include a plurality of data entries and/or records as described above. Data entries in database 132 may be flagged with or linked to one or more additional elements of information, which may be reflected in data entry cells and/or in linked tables such as tables related by one or more indices in a relational database 132. Persons skilled in the art, upon reviewing the entirety of this disclosure, will be aware of various ways in which data entries in database 132 may store, retrieve, organize, and/or reflect data and/or records.

With continued reference to FIG. 1, processor 108 is configured to generate a first cluster profile 136 as a function of the classification. A "cluster profile" for the purposes of this disclosure is a data set containing information relating to an attribute cluster and the classification of the attribute cluster. First cluster profile 136 may include information such as information relating to each element within the first attribute cluster 116 and each corresponding label. For example, first cluster profile 136 may include elements of first attribute cluster 116 and the correlated descriptors 124 associated with each element. In some cases, first cluster profile 136 may further include information such as datum relating to the degree of intensity 140 for each particular descriptor 124 within first attribute cluster 116. In some cases, generating the first cluster profile 136 may further include determining a degree of intensity 140 for each descriptor 124 of one or more descriptors 124. "Degree of intensity" for the purposes of this disclosure refers to a quantity of a particular label within first cluster profile. For example, degree of intensity 140 may include the number of elements labeled with a particular descriptor. In some cases, processor 108 may determine the presence of a particular descriptor 124 (or determine the presence of each descriptor) and determine a quantity of elements classified to the descriptor 124. In some cases, degree of intensity may include the number of elements within first attribute cluster 116 classified to a particular descriptor. For example a degree of intensity of a particular descriptor 124 may be '16' when 16 elements within first attribute cluster have been classified to the particular descriptor 124. In some cases, elements within first attribute cluster 116 may be given differing weightings. "Weighting" for the purposes of this disclosure is an adjustment of a particular datum wherein the adjustment may increase or decrease a value associated with the datum. A value associated with a first datum may be adjusted as a result of a weighting wherein the value may increase or decrease as a result of the weighting. In a non-limiting example, a first element may contain a higher weight than a second element within first attribute cluster 116. In some cases, degree of intensity 140 may be dependent on the weighting of a particular element such that a particular descriptor 124 may have a higher degree of intensity 140 even if less elements are labeled with the particular descriptor. In some cases, generating first cluster profile 136 includes determining a weighting of each element within first attribute cluster 116. In some cases, processor 108 may be configured to retrieve associated weightings with each element using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of first attribute cluster 116 associated with one or more descriptors 124 and weightings. Data within the lookup table may be received from database 132. In some cases, processor 108 may be used to lookup elements within first attribute cluster 116 and receive a correlated weighting associated with the element. For example, a particular element may contain a corresponding weighting such as "1", "2", or "3" wherein the numerical number indicates a particular weighting in comparison to other elements. Processor 108 may then generate a degree of intensity 140 for every descriptor 124 based on the number of elements labeled with descriptors 124 and their corresponding weightings. For example, a particular descriptor 124 may contain a degree of intensity 140 of 9, when a first element associated with the descriptor 124 has a weighting of 4 and a second element associated with the descriptor 124 has a weighting of 5. In some cases, degree of intensity 140 may be generated as a percentage value in comparison to other descriptors 124 such as for example, a first descriptor 124 having a 70% degree of intensity 140 whereas a second descriptor 124 has a 30% degree of intensity 140. In some cases, weightings may be generated based on degree of importance. For example, a first element may contain a higher degree of importance and therefore require a higher rating than the second descriptor. In some cases, a particular weighting associated with each element may be generated using a weighting machine learning model. Weighting machine learning model may be consistent with any machine learning model described in this disclosure. Weighting machine learning model may be trained using weighting training data. Weighting training data may include a plurality of elements of a plurality of first attribute clusters 116 correlated to a plurality of weightings. Weighting machine learning model may output a particular weighting associated with each element. In some cases, weighting machine learning model and/or any other machine learning model as described in this disclosure may be used to improve one or more calculations and/or determinations made by computing device 104. In some cases, improvements may include the ability to compare two data items, the ability to sort items more efficiently, the ability to accurately produce one or more correlated results and the like.

With continued reference to FIG. 1, first cluster profile 136 may include elements of first attribute cluster 116 containing user data. Each element within user data may be classified to a particular descriptor 124 such as for example, simplifier or classifier. First cluster profile 136 may further include a degree of intensity 140 for each descriptor 124 such as a degree of intensity 140 for the simplifier label and a degree of intensity 140 for the multiplier label. For example, the simplifier label and the multiplier label may contain a particular degree of intensity 140 such as a numerical score or a percentage of a total. In some cases, a particular descriptor 124 may contain a higher degree of intensity 140 than another descriptor.

With continued reference to FIG. 1, first cluster profile 136 may further include information relating to the degree of intensity 140 of each descriptor. For example, first cluster profile 136 may contain information about a particular descriptor 124 and its corresponding degree of intensity 140. The information may include insights about the particular degree of intensity 140, such as what the generated degree of intensity 140 means, which elements contained the highest rating with the particular degree of intensity 140, which elements had the lowest degree of intensity 140 and the like. For example, first cluster profile 136 may include information about people who are simplifiers and/or information about people who are multipliers. In some cases, in instances where a particular descriptor 124 is associated with a low degree of intensity 140, first cluster profile 136 may include information on what a low degree of intensity 140 may mean. For example, first cluster profile 136 may include information relating to a low degree of intensity 140 related to a multiplier label wherein first cluster profile 136 may include why a user has a low degree of intensity 140 associated with multipliers. This information may include data indicating that a user may not contain the necessary collaborative skill to be a multiplier and information as to why the user may not possess the particular skill. In some cases, processor 108 may be configured to retrieve information relating to a particular degree of intensity 140 of a descriptor 124 using a lookup table. For example, processor 108 may 'lookup' a particular descriptor 124 and its corresponding degree of intensity 140 and retrieve information associated with the descriptor 124 and the degree of intensity 140. In some cases, the lookup table may contain a range of values wherein processor 108 may select the appropriate table that falls within the range of the particular degree of intensity 140.

With continued reference to FIG. 1, generating the first cluster profile 136 may include generating the cluster profile using a cluster machine learning model 144. Processor 108 may use a machine learning module, such as a cluster machine learning module for the purposes of this disclosure, to implement one or more algorithms or generate one or more machine-learning models, such as an assessment machine learning model, to calculate at least one smart assessments. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 132, such as any database 132 described in this disclosure, or be provided by a user. In other embodiments, a machine-learning module may obtain a training set by querying a communicatively connected database 132 that includes past inputs and outputs. Training data may include inputs from various types of databases 132, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors 124 corresponding to categories of data elements. As a non-limiting example, training data may include data entered in standardized forms by persons or processes, such that entry of a given data element in a given field in a form may be mapped to one or more descriptors 124 of categories. Elements in training data may be linked to categories by tags, tokens, or other data elements. A machine learning module, such as cluster module, may be used to generate cluster machine learning model 144 and/or any other machine learning model described herein using training data. Cluster machine learning model 144 may be trained by correlated inputs and outputs of training data. Training data may be data sets that have already been converted from raw data whether manually, by machine, or any other method. Cluster training data 148 may be stored in database 132. Cluster training data 148 may also be retrieved from database 132.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database 132, such as any database 132 described in this disclosure, or be provided by a user such as a prospective employee, and/or an employer and the like. In other embodiments, machine-learning module may obtain a training set by querying a communicatively connected database 132 that includes past inputs and outputs. Training data may include inputs from various types of databases 132, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors 124 corresponding to categories of data elements. As a non-limiting example, training data may include data entered in standardized forms by persons or processes, such that entry of a given data element in a given field in a form may be mapped to one or more descriptors 124 of categories. Elements in training data may be linked to categories by tags, tokens, or other data elements.

With continued reference to FIG. 1 generating first cluster profile 136 may include receiving cluster training data 148 including a plurality of first attribute clusters 116 correlated to a plurality of first cluster profiles 136. For example, cluster training data 148 may be used to show a particular first attribute cluster 116 correlated to a particular first cluster profile 136. In some cases, cluster training data 148 may be received from a user, third party, database 132, external computing devices previous iterations of the processing and/or the like as described in this disclosure. In some cases, cases cluster training data 148 may include previous iterations of first attribute clusters 116 and previous iterations of first cluster profile 136. In some cases, generating first cluster profile 136 further includes training cluster machine learning model 144 as a function of the cluster training data 148 and generating first cluster profile 136 as a function of the cluster machine learning model 144. In some cases, cluster training data 148 may be trained based in user input wherein user input may determine if a particular training data was accurate as a result of a previous iteration.

With continued reference to FIG. 1, processor 108 is further configured to determine a complementary cluster profile 152 as a function of the first cluster profile 136. A "complementary cluster profile" for the purposes of this disclosure is a cluster profile containing associated elements and/or elements that complement first cluster profile 136. For example, complementary cluster profile 152 may contain one or more elements that are associated and/or complement one or more elements within first cluster profile 136. In some cases, first cluster profile 136 may contain a particular degree of intensity 140 of a particular descriptor 124 wherein complementary cluster profile 152 may contain a similar or opposing descriptor 124 within a similar or differing degree of intensity 140 that compliments first cluster profile 136. For example, if first cluster profile 136 contains a degree of intensity 140 of 90% with respect to a descriptor 124 such as a simplifier, complementary cluster profile 152 may contain a degree of intensity 140 of 10% with respect to a descriptor 124 such as a simplifier. Continuing, in some cases, complementary cluster profile 152 may contain a degree of intensity 140 of 90% with respect to a descriptor 124 such as a multiplier. In some cases, complementary cluster profile 152 may contain opposing degrees of intensity in comparison to first cluster profile 136. For example, complementary cluster profile 152 may contain a high degree of intensity 140 with respect to a particular descriptor 124 whereas first cluster profile 136 may contain a low degree of intensity 140 of the same descriptor. In some cases, complementary cluster profile 152 may contain degrees of intensity that compliments first cluster profile 136. In some cases, complementary cluster profile 152 may contain information indicating why a particular element within complementary cluster profile 152 may complement an element within first cluster profile 136. For example, complementary cluster profile 152 may contain a high degree of intensity 140 with respect to a multiplier descriptor 124 wherein complementary cluster profile 152 may indicate that the particular profile may compliment the first cluster profile 136 containing a high degree of intensity 140 with respect to simplifying. In some cases, complementary cluster profile 152 may be used to find another user that may work well in collaboration with the user described within first cluster profile 136. In some cases, complementary cluster profile 152 may contain information indicating an ideal user and/or another user that may work well in collaboration with the user described in first cluster profile 136.

With continued reference to FIG. 1, in some cases processor 108 may determine complementary cluster profile 152 by receiving a plurality of complementary cluster profiles 152 from database 132. In some cases, a plurality of complementary cluster profiles 152 may be created and/or generated by a user and transmitted to database 132, wherein processor 108 may determine a complementary cluster profile 152 from the plurality of complementary cluster profiles 152. In some cases, complementary cluster profile 152 may be comprised of a first cluster profile 136 of a previous iteration wherein processor 108 transmits the first cluster profile 136 to database 132 at the conclusion of an interaction. In some cases, plurality of complementary cluster profiles may include a plurality of previous cluster profiles wherein the previous cluster profiles are comprised of a plurality of first attribute clusters. In some cases, each complementary cluster profile 152 may consist of a first cluster profile 136 of a previous iteration. In some cases, plurality of complementary cluster profiles 152 are comprised of a plurality of first cluster profiles 136. In some cases, plurality of complementary cluster profiles 152 may include a plurality of first cluster profiles 136 of similar users within an entity. For example, processor 108 may select a corresponding user or employee in which the first user may collaborate with. Continuing the example, processor 108 may select a complementary cluster profile 152 that most suits first cluster profile 136 wherein first cluster profile 136 may be associated with a first employee and complementary cluster profile 152 may be associated with a second employee. In some cases, complementary cluster profile 152 may be used to select pairings of employees based on collaboration skills. For example, processor 108 may pair up two users wherein the first user's attributes may complement the second user's attributes. Continuing, first cluster profile 136 may indicate that a user is primarily a simplifier based on their degree of intensity 140 whereas processor 108 may select a complementary cluster profile 152 of a user who is primarily a multiplier. In some cases, these pairings may allow for increased collaboration skills. In some cases, processor may use a web crawler (as described above) to generate a complementary cluster profile 152. In some cases, processor 108 may generate a plurality of complementary cluster profiles and select a complementary cluster profile as a function of first cluster profile 116. In some cases, the web crawler may be configured to generate complementary cluster profiles of similar users within a company, similar users within the same industry and the like. In some case a particular complementary cluster profile 152 may be selected of a user within a particular industry wherein processor may determine that two particular individuals within an industry may match. In some cases, the web crawler may be seeded with social media sites or professional job networking sites wherein processor may generate a plurality of first cluster profiles and select a particular cluster profile may be selected.

With continued reference to FIG. 1, in some cases, complementary cluster profile 152 may be determined using a complementary machine learning model 156. Determining complementary cluster profile 152 may include receiving complementary training data 160 wherein the complementary training data 160 includes a plurality of first cluster profiles 136 correlated to a plurality of complementary cluster profiles 152. In an embodiment, complementary training data 160 may indicate that a particular first cluster profile 136 may contain a corresponding complementary cluster profile 152. In some cases, determining complementary cluster profile 152 includes training complementary machine learning model 156 as a function of the complementary training data 160 and determining complementary cluster profile 152 as a function of the complementary machine learning model 156. In some cases, complementary training data 160 may be generated in any way as described within this disclosure. This includes, but is not limited to, receiving training data from a user, $3^{rd}$ party, external computing device, previous iterations of the processing and the like. In some cases complementary machine learning model 156 may be retained through user input wherein a user may input whether two profiles were properly paired.

With continued reference to FIG. 1, processor 108 may further be configured to create a user interface data structure 164. As used in this disclosure, "user interface data structure" is a data structure representing a specialized formatting of data on a computer configured such that the information can be effectively presented for a user interface. In some cases, user interface data structure 164 includes first cluster profile 136 and/or complementary cluster profile 152. In some cases, user interface data structure 164 may include any data described in this disclosure. In some cases, user interface data structure 164 may be configured to modify a user interface, wherein data with user interface data structure may be represented visually by the user interface 164.

With continued reference to FIG. 1, processor 108 may be configured to transmit the user interface data structure 164. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 132 wherein the data may be accessed from database 132, processor 108 may further transmit the data above to a device display 168 or another computing device 104.

With continued reference to FIG. 1, apparatus 100 may further include a graphical user interface 120 (GUI) communicatively connected to processor 108. For the purposes of this disclosure, a "user interface" is a means by which a user and a computer system interact. For example a user may interact with a computer system through the use of input devices and software wherein user interface may be configured to facilitate the interaction between the user and the computer system. A user interface may include graphical user interface 120, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 120 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 120. Persons skilled in the art, upon reviewing the entirety of this disclosure, will be aware of various ways in which a graphical user interface 120 and/or elements thereof may be implemented and/or used as described in this disclosure. In some cases, graphical user interface 120 may be modified as a function of the user interface data structure 164. For example, user interface data structure 164 may include rules to generate one or more interaction components to be displayed visually by the graphical user interface. In some cases, graphical user interface 120 may visually present data within user interface data structure 164 wherein changes in user interface data structure may result in changes to elements visually displayed in graphical user interface 120. In some cases, processor may be configured to modify graphical user interface 120 as a function of the user interface data structure.

With continued reference to FIG. 1, apparatus 100 may further include a display 168 communicatively connected to at least a processor 108. "Display" for the purposes of this disclosure is a device configured to show visual information. In some cases, display 168 may include a liquid crystal display (LCD), a cathode ray tube (CRT), a plasma display, a light emitting diode (LED) display, and any combinations thereof. Display 168 may include a display device. Display device may include, but is not limited to, a smartphone, tablet, laptop, monitor, tablet, and the like. Display device may include a separate device that includes a transparent screen configured to display computer generated images and/or information. In some cases, display 168 may be configured to present GUI 120 to a user, wherein a user may interact with GUI 120. In some cases, a user may view GUI 120 through display 168.

With continued reference to FIG. 1, display 168 may be configured to receive the user interface structure and display 168 first cluster profile 136 and/or complementary cluster profile 152 as a function of the user interface data structure 164. GUI 120 may be displayed on a display device such as display 168 wherein data may be viewed through the user interface. In some cases, GUI 120 may contain an interaction component. "Interaction component" for the purposes of this disclosure is a device or a computer program that is capable of allowing a user to interact with GUI 120. Interaction component may include a button or similar clickable elements wherein the clicking of the button may initiate a response or a command. In some cases, interaction component may allow a user to input first attribute cluster 116, wherein interaction component may include a text box or clickable buttons that allow a user to input elements of first attribute cluster 116. In some cases, interaction component may include multiple check boxes on display 168, wherein the clicking of a checkbox may indicate to processor 108 that a specific input was entered. For example, a checking of a checkbox having the number "one" displayed on it, may indicate to processor 108 that user has entered a score of "1". Interaction component may further contain drop down menus where a user may choose from a list of commands wherein the list of commands may perform different functions. For example, a command may include pausing or stopping the data that is being displayed. In some cases, a command may allow a user to process another iteration or go back and input more data. Interaction component may further include dialog or comment boxes wherein users may enter comments about data that is displayed. Comment boxes may be consistent with user input as described. Interaction component may further allow a user to modify or change data within first cluster profile 136 and/or complementary cluster profile 152. In some cases, interaction component may be used to provide feedback to an operator. In some cases, interaction component may allow a user to provide feedback on any data generated by computing such that a machine learning model may be trained to provide better results.

With continued reference to FIG. 1, display 168 may be configured to display multiple complementary cluster profiles 152 wherein processor 108 determines that more than one complementary cluster profiles 152 may be selected. In some cases, display 168 may be configured to display data as 'clickable elements' through the use of GUI 120 wherein a user may select a particular data and view any data that may be associated. For example, display 168 may display multiple complementary cluster profiles 152 as a clickable element wherein selection of a particular profile may signal to processor 108 to display the corresponding data associated with the profile.

Figure 2:
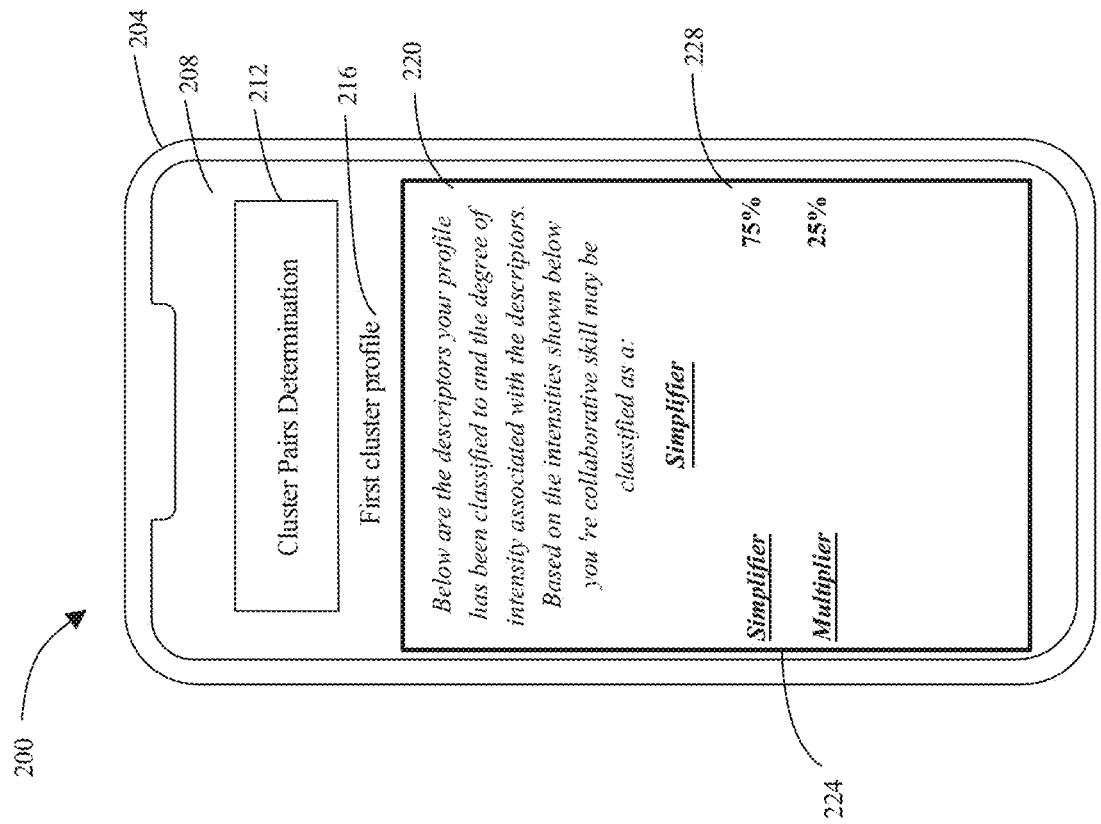
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and display any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purposes of this disclosure is the information that is capable of being displayed within a border of device display. A user may navigate through different windows 208 wherein each window 208 may contain new or differing information or data. For example, a first window 208 may display information relating to the first cluster profile, whereas a second window may display information relating to the complementary cluster profile as described in this disclosure. A user may navigate through a first second, third and fourth window (and so on) by interacting with GUI 200. For example, a user may select a button or a box signifying a next window on GUI, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows 208 wherein each window 208 may request or display information to or form a user. In this instance, window 208 displays an identification field 212 wherein the identification field signifies to a user, the particular action/computing that will be performed by a computing device. In this instance identification field 212 contains information stating "Cluster Pairs Determination" wherein a user may be put on notice that any information being received or displayed will be used to determine cluster pairs. Identification field 212 may be consistent throughout multiple windows 212. Additionally, in this instance window 208 may display a sub identification field 216 wherein the sub identification field may indicate to a user the type of data that is being displayed or the type of data that is being received. In this instance, sub identification field 216 contains "first cluster profile". This may indicate to a user that computing device is displaying the information related to the first cluster profile. Additionally, window 208 may contain a prompt 220 indicating the data that is being described in sub identification field 216 wherein prompt 220 is configured to display to a user the data that has been generated. In this instance, prompt 220 notifies a user that the user may be primarily a simplifier based on classified data. Further GUI 200 may contain data relating to the first cluster profile. In this instance, GUI 200 displays descriptors 224 wherein each descriptor 224 contains a corresponding degree of intensity 228. GUI 200 may display the descriptors 224 and the corresponding degrees of intensity 228 such that a user may visually see how each particular descriptor contributed to the overall determination displayed within prompt 220.

With continued reference to FIG. 2, GUI 200 may be configured to receive user feedback. For example, GUI may be configured to generate complementary cluster profile 152 wherein a user may interact with GUI 200 and provide feedback on the complementary cluster profile 152. In some cases, user feedback may be used to train a machine learning model as described above. In some cases, user feedback may be used to indicate to computing device 104 to generate another complementary cluster profile. In some cases, a user may determine that a particular profile is not a match wherein computing device 104 may determine an alterne complementary cluster profile 152.

Figure 3:
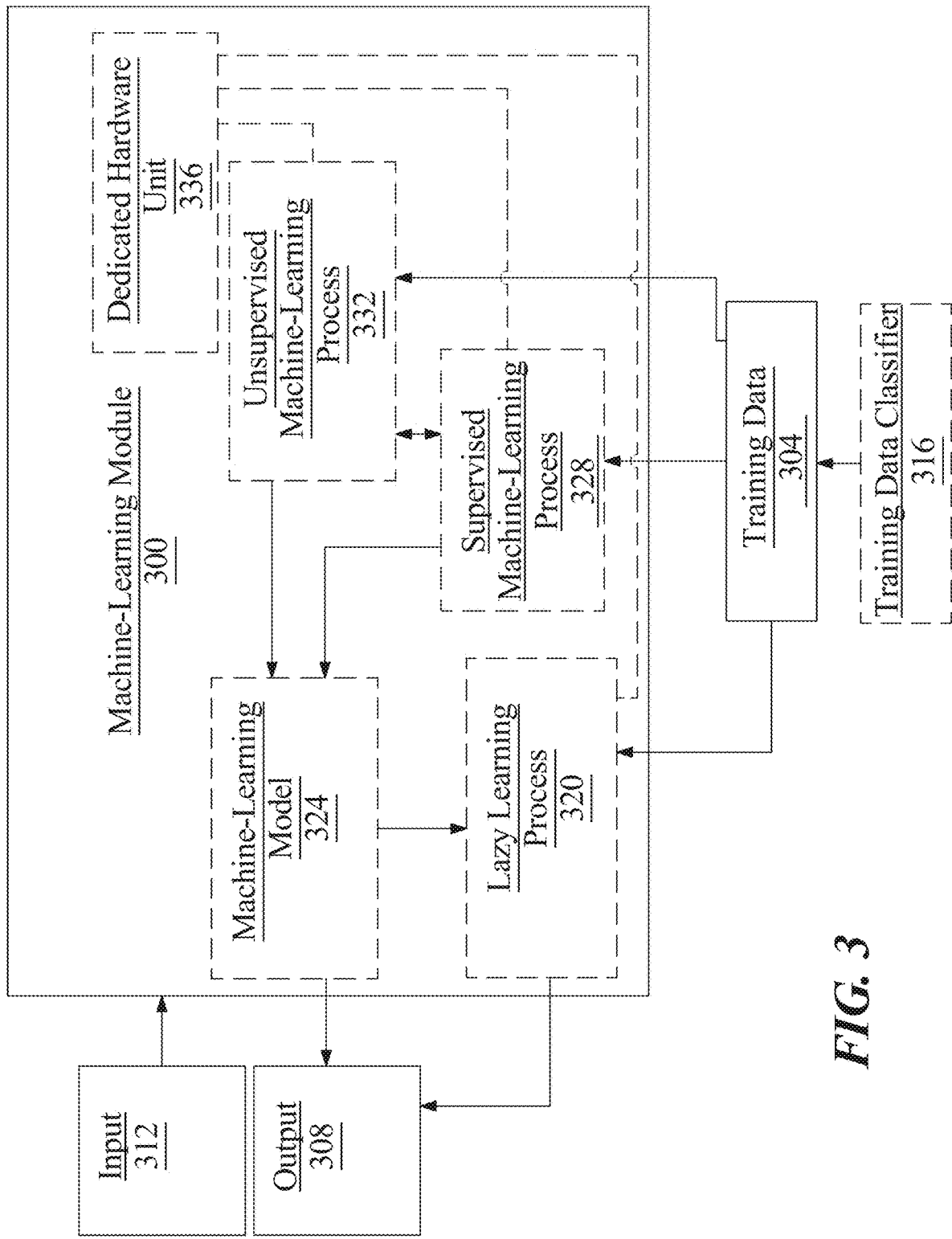
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include first attribute clusters as described above and outputs may include first cluster profiles.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to one or more descriptors as described above. In an embodiment an attribute cluster and a cluster profile may be classified to a similar descriptor. In yet another embodiment, a particular cluster profile may be selected based on a particular classified attribute cluster. In one or more embodiments, classification may allow for minimization in error wherein only outputs associated with a similar classification may be selected.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include attribute ulster as described above as inputs, first cluster profile as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
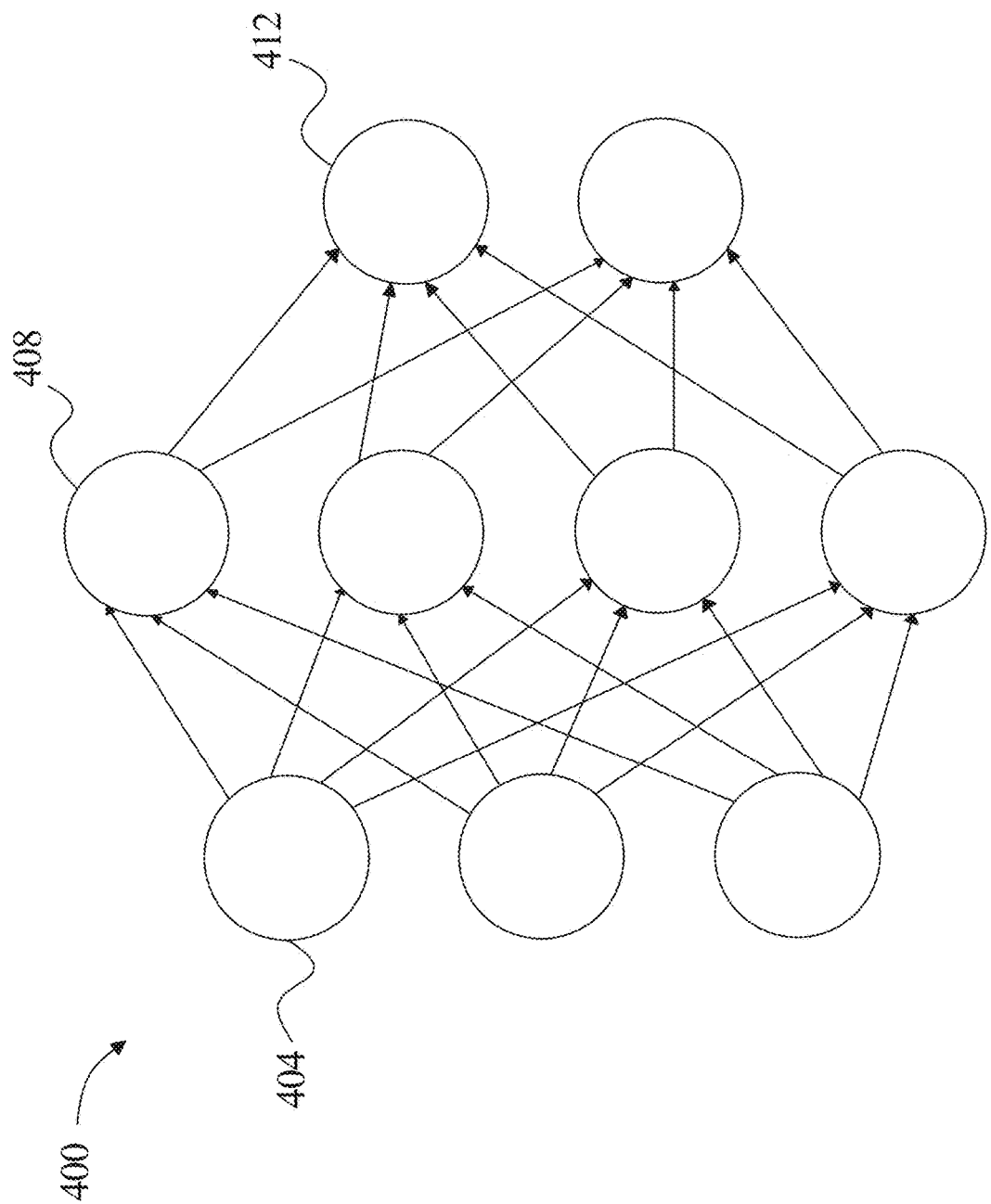
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
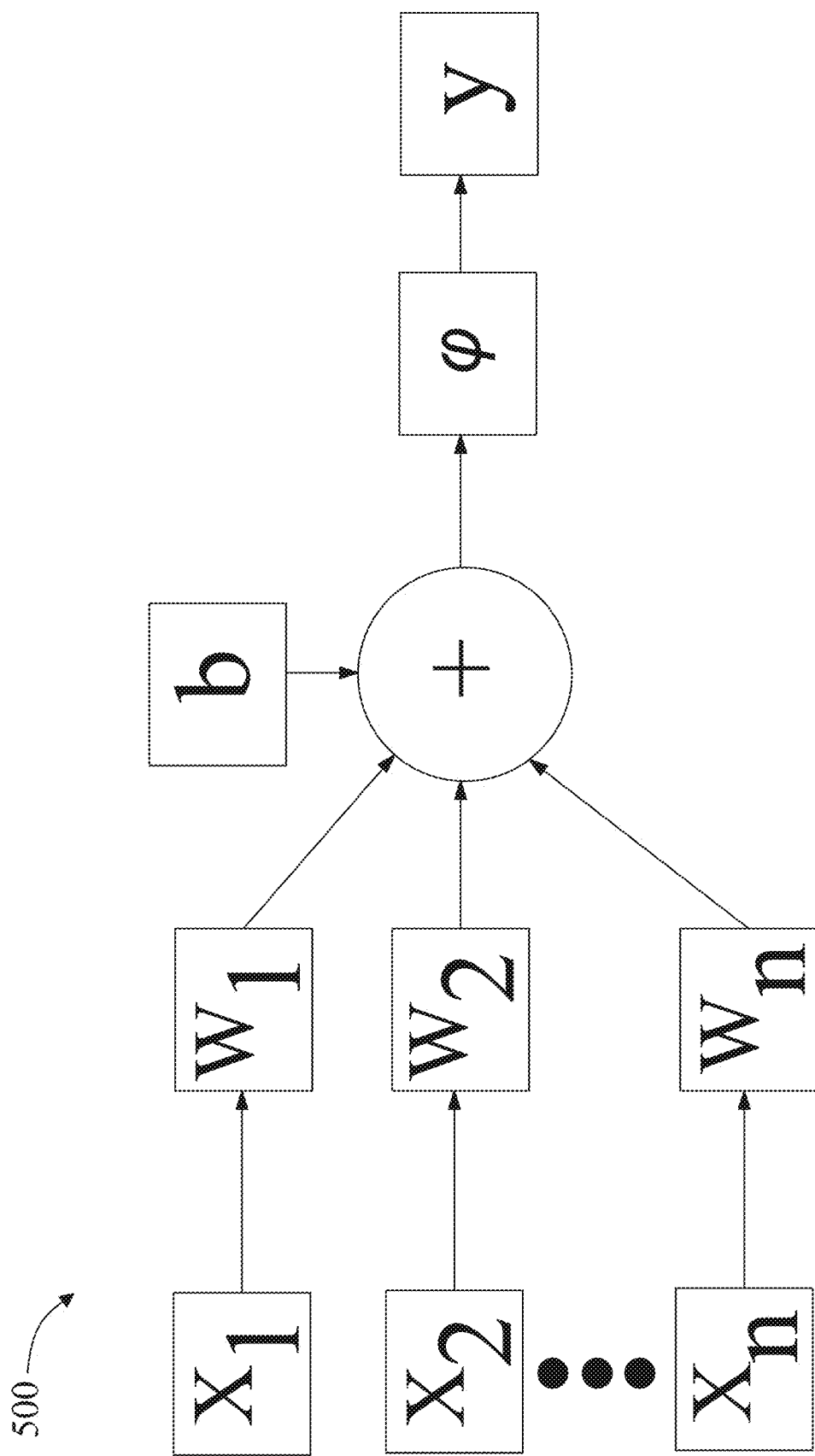
FIG. 5 is a block diagram of an exemplary embodiment of a node.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
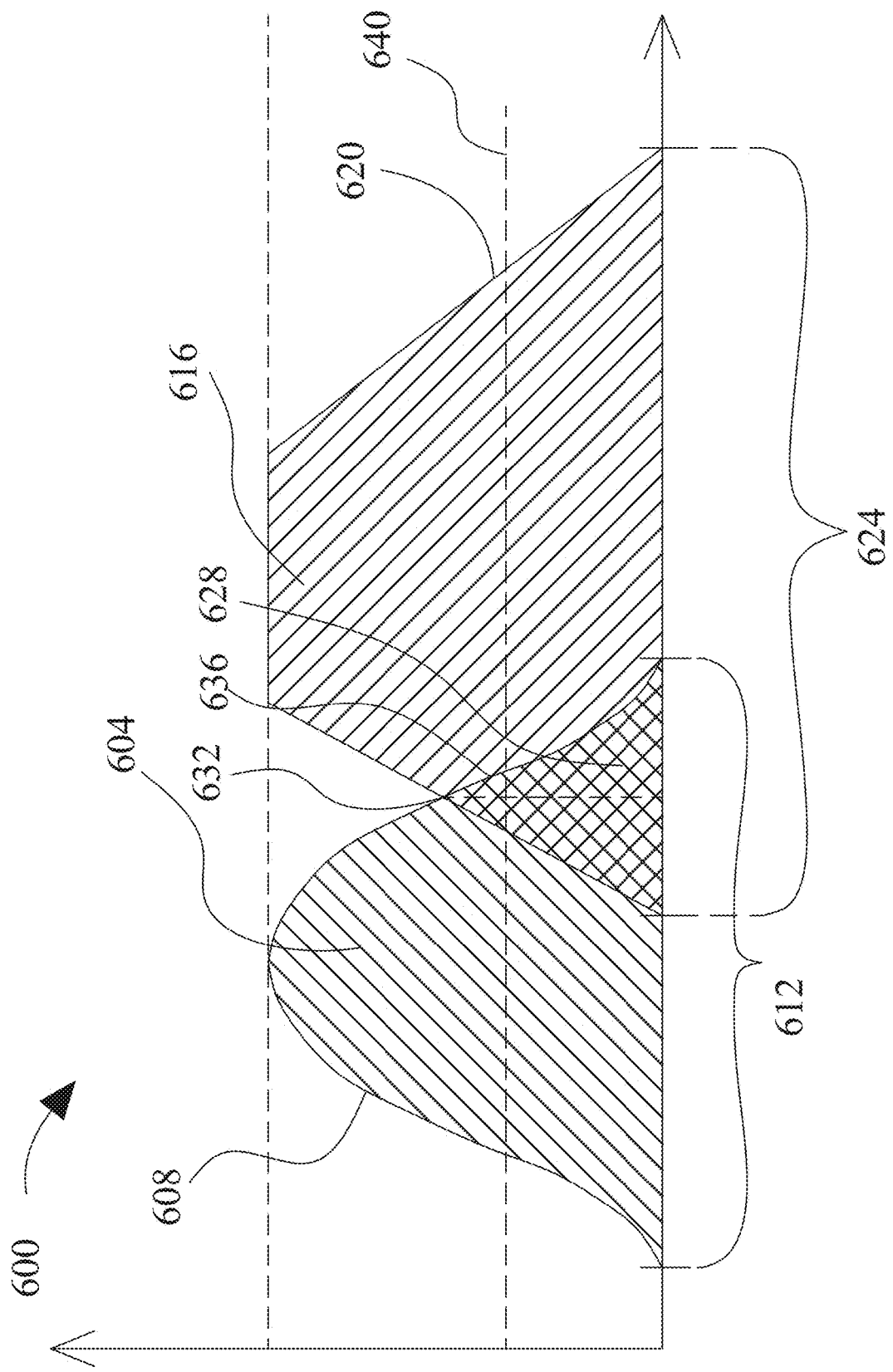
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, first attribute cluster, and a predetermined class, such as without limitation of descriptors A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or first attribute cluster and a predetermined class, such as without limitation descriptors categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a first attribute cluster with descriptors. For instance, if a descriptors has a fuzzy set matching first attribute cluster fuzzy set by having a degree of overlap exceeding a threshold, processor may classify the first attribute cluster as belonging to the descriptors categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a first attribute cluster may be compared to multiple descriptors categorization fuzzy sets. For instance, first attribute cluster may be represented by a fuzzy set that is compared to each of the multiple descriptors categorization fuzzy sets; and a degree of overlap exceeding a threshold between the first attribute cluster fuzzy set and any of the multiple descriptors categorization fuzzy sets may cause processor to classify the first attribute cluster as belonging to descriptors categorization. For instance, in one embodiment there may be two descriptors categorization fuzzy sets, representing respectively descriptors categorization and a descriptors categorization. First descriptors categorization may have a first fuzzy set; Second descriptors categorization may have a second fuzzy set; and first attribute cluster may have a first attribute cluster fuzzy set. processor, for example, may compare a first attribute cluster fuzzy set with each of descriptors categorization fuzzy set and in descriptors categorization fuzzy set, as described above, and classify a first attribute cluster to either, both, or neither of descriptors categorization or in descriptors categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, first attribute cluster may be used indirectly to determine a fuzzy set, as first attribute cluster fuzzy set may be derived from outputs of one or more machine-learning models that take the first attribute cluster directly or indirectly as inputs.

Still referring to FIG. 6, a computing device may use a logic comparison program, such as, but not limited to, a fuzzy logic model to determine a descriptor's response. An descriptors response may include, but is not limited to, simplifier or multiplier; each such descriptors response may be represented as a value for a linguistic variable representing descriptors response or in other words a fuzzy set as described above that corresponds to a degree of compatibility as calculated using any statistical, machine-learning, or other method that may occur to a person skilled in the art upon reviewing the entirety of this disclosure. In other words, a given element of first attribute cluster may have a first non-zero value for membership in a first linguistic variable value such as first score label and a second non-zero value for membership in a second linguistic variable value such as second score label In some embodiments, determining a descriptors categorization may include using a linear regression model. A linear regression model may include a machine learning model. A linear regression model may be configured to map data of first attribute cluster, such as degree of . . . to one or more descriptors parameters. A linear regression model may be trained using a machine learning process. A linear regression model may map statistics such as, but not limited to, quality of first attribute cluster. In some embodiments, determining an descriptors of first attribute cluster may include using a descriptors classification model. A descriptors classification model may be configured to input collected data and cluster data to a centroid based on, but not limited to, frequency of appearance, linguistic indicators of quality, and the like. Centroids may include scores assigned to them such that quality of . . . of first attribute cluster may each be assigned a score. In some embodiments descriptors classification model may include a K-means clustering model. In some embodiments, descriptors classification model may include a particle swarm optimization model. In some embodiments, determining the descriptors of a first attribute cluster may include using a fuzzy inference engine. A fuzzy inference engine may be configured to map one or more first attribute cluster data elements using fuzzy logic. In some embodiments, first attribute cluster may be arranged by a logic comparison program into descriptors arrangement. A "descriptors arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given linguistic score level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to first attribute cluster, such as a degree of compatibility of an element, while a second membership function may indicate a degree of in descriptors of a subject thereof, or another measurable value pertaining to first attribute cluster. Continuing the example, an output linguistic variable may represent, without limitation, a score value. An inference engine may combine rules, such as: "if the compatibility level is 'high' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "of" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 6, first attribute cluster to be used may be selected by user selection, and/or by selection of a distribution of output scores, such as 60% simplifier and 40% multiplier and the like. Each descriptors categorization may be selected using an additional function such as in descriptors as described above.

Figure 7:
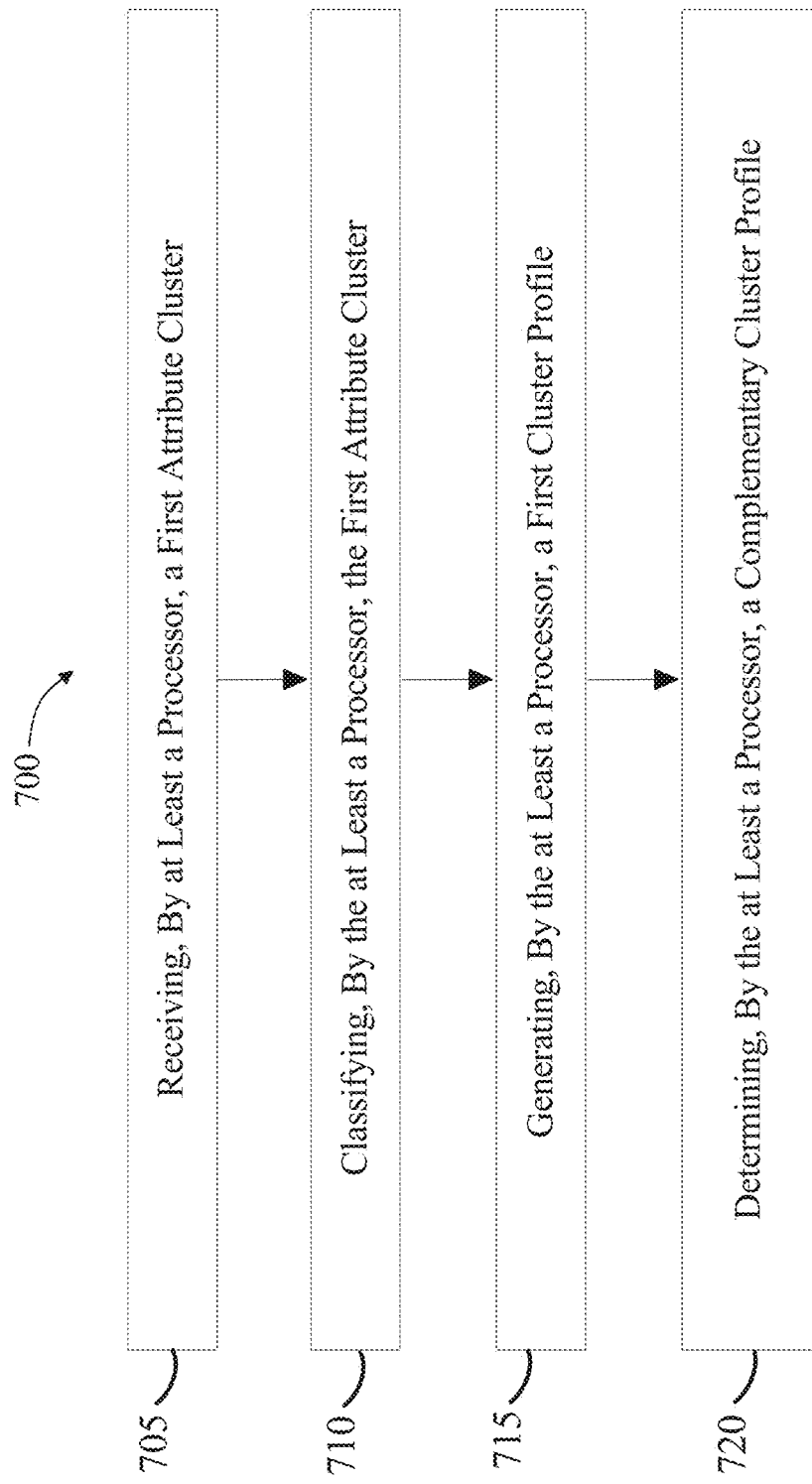
FIG. 7 is a flow diagram illustrating an exemplary embodiment of a method for determining cluster pairs.

Referring now to FIG. 7, a method 700 for determining cluster pairs is described. At step 705, method 700 includes receiving, by at least a processor, a first attribute cluster. In some cases wherein receiving, by the at least a processor, the first attribute cluster comprises receiving, by a graphical user interface communicatively connected to the at least a processor, the first attribute cluster. In some cases, first attribute cluster may be received using a WebCrawler. This step may be implemented as described above with reference to FIGS. 1-7, without limitation.

With continued reference to FIG. 7, at step 710 method 700 includes classifying, by the at least a processor, the first attribute cluster to one or more descriptors. In some cases, classifying, by the at least a processor, the first attribute cluster to one or more descriptors comprises classifying the first attribute cluster using a descriptor classifier. In some cases, generating descriptor classifier may include using training data, wherein the training data includes a plurality of first attribute clusters correlated to a plurality of descriptors. This step may be implemented as described above with reference to FIGS. 1-7, without limitation.

With continued reference to FIG. 7, at step 715, method 700 includes generating, by the at least a processor, a first cluster profile as a function of the classification. In some cases, generating, by the at least a processor, a first cluster profile as a function of the classification includes determining a degree of intensity of each descriptor of the one or more descriptors. In some cases the first cluster profile includes information relating to the degree of intensity of each descriptor. In some cases, the degree of intensity includes a number of elements within first attribute cluster classified to each descriptor. In some cases wherein generating, by the at least a processor, a first cluster profile includes receiving cluster training data comprising a plurality of classified first attribute clusters correlated to a plurality of first cluster profiles, training a cluster machine learning model as a function of the cluster training data, and generating the first cluster profile as a function of the cluster machine learning model. In some cases generating, by the at least a processor, a first cluster profile comprises determining a weighting for each element within first attribute cluster. This step may be implemented as described above with reference to FIGS. 1-7, without limitation.

With continued reference to FIG. 7, at step 720 method 700 includes determining, by the at least a processor, a complementary cluster profile as a function of the first cluster profile. In some cases, determining, by the at least a processor, a complementary cluster profile as a function of the first cluster profile includes receiving a plurality of complementary cluster profiles from a database, and selecting one complementary cluster profile from the plurality of complementary cluster profiles. In some cases, the plurality of complementary cluster profiles are comprised of a plurality of first cluster profiles of previous iterations. In some cases, determining, by the at least a processor, a complementary cluster profile as a function of the first cluster profile comprises determining a complementary cluster profile as a function of a complementary machine learning model. In some cases, method 700 further includes creating, by the at least a processor, a user interface data structure as a function of the first cluster profile and the complementary cluster profile. This step may be implemented as described above with reference to FIGS. 1-7, without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
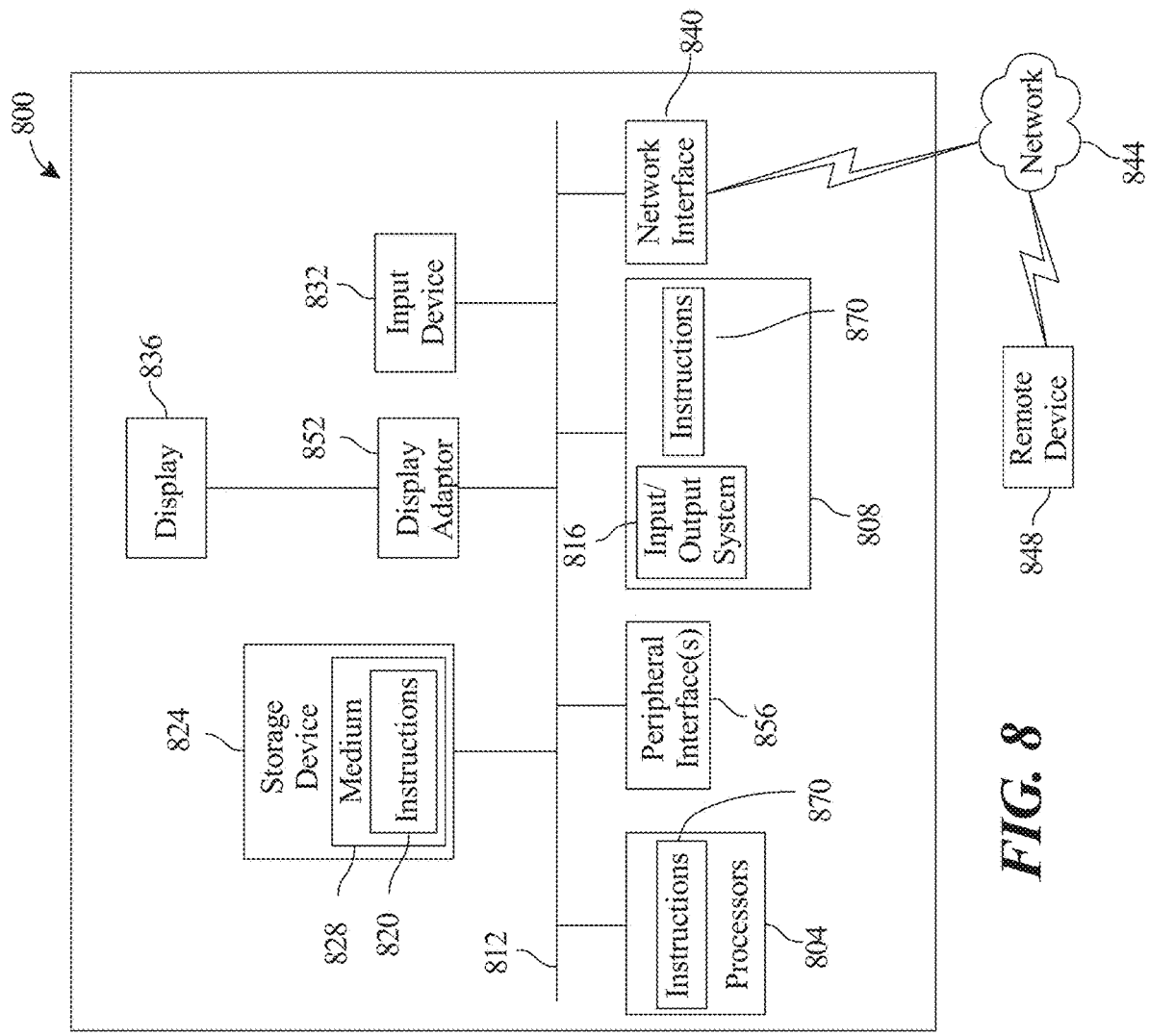
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining cluster pairs, the apparatus comprising:
   a processor; and
   a memory communicatively connected to the processor, the memory containing instructions configuring the processor to:
   receive a first attribute cluster comprising user data relating to a user's collaboration capabilities;
   classify the first attribute cluster to one or more descriptors;
   generate a first cluster profile as a function of the classification and the first attribute cluster comprising elements of the first attribute cluster including the user data, wherein the first cluster profile comprises a degree of intensity associated with each descriptor of the one or more descriptors, wherein generating the first cluster profile comprises determining a weighting for each element within the first attribute cluster using a weighting machine learning model, wherein use of the weighting machine learning model results in improved accuracy in selection of data contained in the first cluster profile; and
   determine a complementary cluster profile as a function of the first cluster profile comprising associated elements comprising a collaboration skill that complements the first cluster profile, wherein determining the complementary cluster profile comprises:
   receiving a plurality of complementary cluster profiles from a database;
   comparing each complementary cluster profile of the plurality of cluster profiles with the first cluster profile, wherein the comparison comprises identifying the collaboration skill that complements the first cluster profile; and
   selecting one complementary cluster profile from the plurality of complementary cluster profiles based on the comparison of each complementary cluster profile of the plurality of cluster profiles with the first cluster profile.

2. The apparatus of claim 1, wherein receiving the first attribute cluster comprises receiving the first attribute cluster using a web crawler, wherein the web crawler is configured to generate a search query as a function of search criteria received from the user.

3. The apparatus of claim 1, wherein classifying the first attribute cluster to one or more descriptors comprises:
   generating a descriptor classifier using training data wherein the training data comprises a plurality of first attribute clusters correlated to a plurality of descriptors; and
   classifying the first attribute cluster using the descriptor classifier.

4. The apparatus of claim 1, wherein the degree of intensity comprises a number of elements within the first attribute cluster classified with each descriptor of the one or more descriptors.

5. The apparatus of claim 1, wherein the processor is further configured to create a user interface data structure as a function of the first cluster profile and the complementary cluster profile.

6. The apparatus of claim 1, wherein the weighting machine learning model is trained using weighting training data comprising a plurality of elements of first attribute clusters correlated to a plurality of weightings.

7. The apparatus of claim 1, wherein generating the first cluster profile comprises:
   receiving cluster training data comprising a plurality of classified first attribute clusters correlated to a plurality of first cluster profiles;
   training a cluster machine learning model as a function of the cluster training data; and
   generating the first cluster profile as a function of the cluster machine learning model.

8. The apparatus of claim 1, wherein receiving the first attribute cluster comprises receiving the first attribute cluster through a graphical user interface.

9. The apparatus of claim 1, wherein the plurality of complementary cluster profiles comprise a plurality of previous cluster profiles.

10. The apparatus of claim 1, wherein determining the complementary cluster profile as a function of the first cluster profile comprises determining a complementary cluster profile as a function of a complementary machine learning model.

11. A method for determining cluster pairs, the method comprising:
   receiving, by at least a processor, a first attribute cluster comprising user data relating to a user's collaboration capabilities;
   classifying, by the at least a processor, the first attribute cluster to one or more descriptors;
   generating, by the at least a processor, a first cluster profile as a function of the classification and the first attribute cluster comprising elements of the first attribute cluster including the user data, wherein the first cluster profile comprises a degree of intensity of each descriptor of the one or more descriptors, wherein generating the first cluster profile comprises determining a weighting for each element within the first attribute cluster using a weighting machine learning model, wherein use of the weighting machine learning model results in improved accuracy in selection of data contained in the first cluster profile; and
   determining, by the at least a processor, a complementary cluster profile as a function of the first cluster profile comprising associated elements comprising a collaboration skill that complements the first cluster profile and further comprising:
   receiving a plurality of complementary cluster profiles from a database;
   comparing each complementary cluster profile of the plurality of cluster profiles with the first cluster profile, wherein the comparison comprises identifying the collaboration skill that complements the first cluster profile; and
   selecting one complementary cluster profile from the plurality of complementary cluster profiles based on the comparison of each complementary cluster profile of the plurality of cluster profiles with the first cluster profile.

12. The method of claim 11, wherein receiving, by the at least a processor, the first attribute cluster comprises receiving, by the at least a processor, the first attribute cluster using a web crawler, wherein the web crawler is configured to generate a search query as a function of search criteria received from the user.

13. The method of claim 11, wherein classifying, by the at least a processor, the first attribute cluster to one or more descriptors comprises:
    generating a descriptor classifier using training data, wherein the training data comprises a plurality of first attribute clusters correlated to a plurality of descriptors; and
    classifying the first attribute cluster using the descriptor classifier.

14. The method of claim 11, wherein the degree of intensity comprises a number of elements within the first attribute cluster classified with each descriptor of the one or more descriptors.

15. The method of claim 14, further comprising creating, by the at least a processor, a user interface data structure as a function of the first cluster profile and the complementary cluster profile.

16. The method of claim 11, wherein generating, by the at least a processor, wherein the weighting machine learning model is trained using weighting training data comprising a plurality of elements of first attribute clusters correlated to a plurality of weightings.

17. The method of claim 11, wherein generating, by the at least a processor, the first cluster profile comprises:
    receiving cluster training data comprising a plurality of classified first attribute clusters correlated to a plurality of first cluster profiles;
    training a cluster machine learning model as a function of the cluster training data; and
    generating the first cluster profile as a function of the cluster machine learning model.

18. The method of claim 11, wherein receiving, by the at least a processor, the first attribute cluster comprises receiving the first attribute cluster by a graphical user interface.

19. The method of claim 11, wherein the plurality of complementary cluster profiles comprise a plurality of previous cluster profiles.

20. The method of claim 11, determining, by the at least a processor, a complementary cluster profile as a function of the first cluster profile comprises determining a complementary cluster profile as a function of a complementary machine learning model.

* * * * *